March 7, 1972   NOBUO HASEGAWA ET AL   3,647,695
HEAT RESISTING INSULATING MATERIALS FOR ELECTRIC PARTS
Filed June 18, 1969
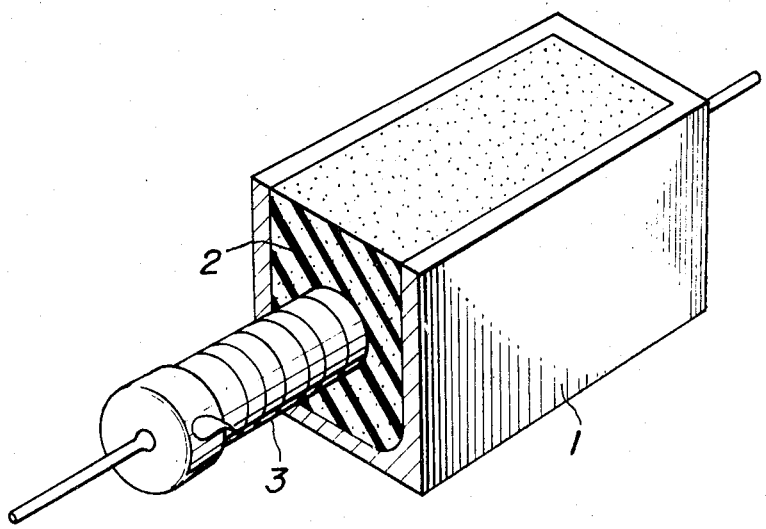
Nobuo HASEGAWA
AND
TAKAHIRO KAMO
INVENTORS
BY Stevens, Davis, Miller & Mosher
ATTORNEYS United States Patent Office 3,647,695
Patented Mar. 7, 1972

3,647,695
HEAT RESISTING INSULATING MATERIALS FOR ELECTRIC PARTS
Nobuo Hasegawa, Uji-shi, and Takahiro Kamo, Osaka, Japan, assignors to Matsushita Electric Industrial Co., Ltd., Kadoma-shi, Osaka, Japan
Filed June 18, 1969, Ser. No. 834,455
Claims priority, application Japan, June 25, 1968, 43/44,720, 43/44,721
Int. Cl. F16l 59/00; H01b 3/10
U.S. Cl. 252—62                3 Claims

ABSTRACT OF THE DISCLOSURE

A heat resisting insulating inorganic material which consists of a phosphate, a siliceous sand and a plurality of metal oxides, and which is adapted for use, in the form of an aqueous slurry, in covering electric parts, such as resistors and heaters, by dipping, molding or coating, said slurry being hardened by a heat treatment at a temperature not higher than 400° C.

---

The present invention relates to a heat resisting insulating material used for the coating of such electric parts as condensers, resistors, sheathed heaters and fuses, which is excellent in incombustibility, resistance to heat and insulation resistance.

As an electric part insulating material of the type described above, the following compositions have been used heretofore:

(1) Mixtures of red iron oxide ($\alpha$-$Fe_2O_3$) and silicone resins, which may or may not comprise $SiO_2$ as aggregate.

(2) Talc powder ($MgO$-$SiO_2$ type compound) bound with water glass.

(3) Glazes (oxides of Ba, Al, B, etc.) applied on an electric part in a molten state and solidified.

Such conventional compositions, however, have the defects that the coatings formed using said compositions generate heat or catch fire under heat of operation and are low in insulation resistance, and that the workability is poor. Particularly, use of the glazes is disadvantageous in that the winding on which the glaze coating is formed (in case of a resistor) is corroded.

The object of the present invention is to provide a heat resisting insulating material which is substantially free of the above-described drawbacks of the conventional compositions and which consists of a mixture of an aggregate, a binder and an additive to be mentioned below:

Namely, talc powder, mica powder and silica powder are used as the aggregate and phosphates are used as the binder. The phosphates include, for example, the phosphoric compounds of Zn, Mg, Al, Ca, Fe, Mn, Ti, Cr, Cu, Ba, Pb, Sb, Bi, Ni, etc., which may be in the form of monohydrogenphosphate (e.g. $Al_2(HPO_4)_3$), dihydrogenphosphate (e.g. $Al(H_2PO_4)_3$) or hydrogen free phosphate (e.g. $AlPO_4$). These phosphates may be used singly or in the form of a mixture consisting of two or more of them. Further, the phosphates used may comprise two or more metals.

The additives used include oxides and hydrates of Zn, Mg, Al, Ca, Ti, Cr, Mn, Fe, Cu, Ni, Co, Sr, Ag, Cd, Ba, Pb, Bi, etc. These oxides and hydrates may be used singly or in the form of a mixture consisting of two or more of them.

Besides the above, metal oxides $Sb_2O_3$ and $ZrO_2$ are used as additives for the purpose of preventing the coating catching fire during its heat insulting activity, slowing the reaction, improving the water repellency and improving the workability of the composition. The components described above are homogeneously mixed with a small amount of water, and the resultant mixture is applied on an electric part and solidified thereon with heat.

In order that the present invention may be more clearly understood, an example of application of the present material will be described with reference to the accompanying drawing which is a perspective view, partly shown in section, of a fixed resistor which is coated with the present heat resisting insulating material.

Referring to the drawing, reference numeral 1 designates a porcelain casing, 2 an insulating material and 3 a winding constituting a resistor body. The insulating material is, as described previously, composed of an aggregate, a binder and additives. In consideration of workability and cost, silica powders af about 50–100 mesh and about 200–300 mesh were used as the aggregate, in the proportion of 1:3 and to which were added aluminum primary phosphate as binder, and alumina hydrate and small amounts of antimony oxide and zirconium oxide as additives.

In the experiment, the heat resistance, workability and inflammability by spark of the coating were examined on various compositions of the present heat resisting insulating material consisting of about 30–90% by weight of silica, about 2–30% by weight of aluminium primary phosphate, about 2.5–40% by weight of alumina hydrate, about 0.5–5% by weight of zirconium oxide and a small amount of antimony oxide. As a result, it has been found that a material which is best with respect to the aforesaid requirements is of a composition consisting of about 77.5% by weight of silica, about 10% by weight of aluminum primary phosphate, about 10% by weight of alumina hydrate, about 2% by weight of zirconium oxide and about 0.5% by weight of antimony oxide. In coating the material, the respective components were thoroughly mixed with a small amount of water to form a slurry and after charging the slurry in the porcelain casing 1, it was solidified with heat in a furnace maintained at a temperature of about 250° C. Although in the example described above use was made of a casing, it will be obvious that the present insulating material can be used without using the casing.

As may be understood from the foregoing description, the heat resisting insulating material according to the present invention has the advantages that it will not catch fire during its heat insulating activity by reason of the fact that it does not comprise organic compounds such as silicone resins, and that it has excellent workability because it does not comprise a glaze such as enamel and simultaneously the coating process can be simplified because it need not be molten prior to application. Moreover, since the material comprises a small amount of zirconium oxide, the coating formed is highly water-repellent and excellent workability of the material can be obtained. There are further advantages in that the setting time can be drastically shortened owing to the fact that the material is thermosetting, and that the coating of the material produces a strong bond between it and a winding when formed on a winding resistor. It should also be noted that according to the present invention an insulating coating can be formed with inexpensive component materials, which is not susceptible to cracking and breakage.

What is claimed is:

1. A heat resisting insulating material for electric parts, consisting essentially of an aggregate of a powder of silica, aluminum primary phosphate as the binder, alumina hydrate and small amounts of antimony oxide and zirconium oxide.

2. A heat resisting insulating material for electric parts as defined in claim 1, wherein said material consists essentially of about 30–90% by weight of said aggregate, about 2–30% by weight of said binder, about 2.5–40% by weight of alumina hydrate, about 0.5–5% by weight of zirconium oxide and the remainder of antimony oxide.

3. A heat resisting insulating material for electric parts as defined in claim 2, wherein said material consists essentially of about 77.5% by weight of said aggregate, about 10% by weight of said binder, about 10% by weight of said alumina hydrate, about 2% by weight of said zirconium oxide and about 0.5% by weight of said antimony oxide.

References Cited

UNITED STATES PATENTS

| 2,768,264 | 10/1956 | Jones et al. | 252—63.2 X |
| 3,382,082 | 5/1968 | Eubanks et al. | 252—62 X |
| 3,462,314 | 8/1969 | Berger et al. | 252—63.5 X |
| 3,490,953 | 1/1970 | Berger et al. | 252—63.5 X |

HAROLD ANSHER, Primary Examiner

U.S. Cl. X.R.

252—63.2, 63.5